Figure 1:
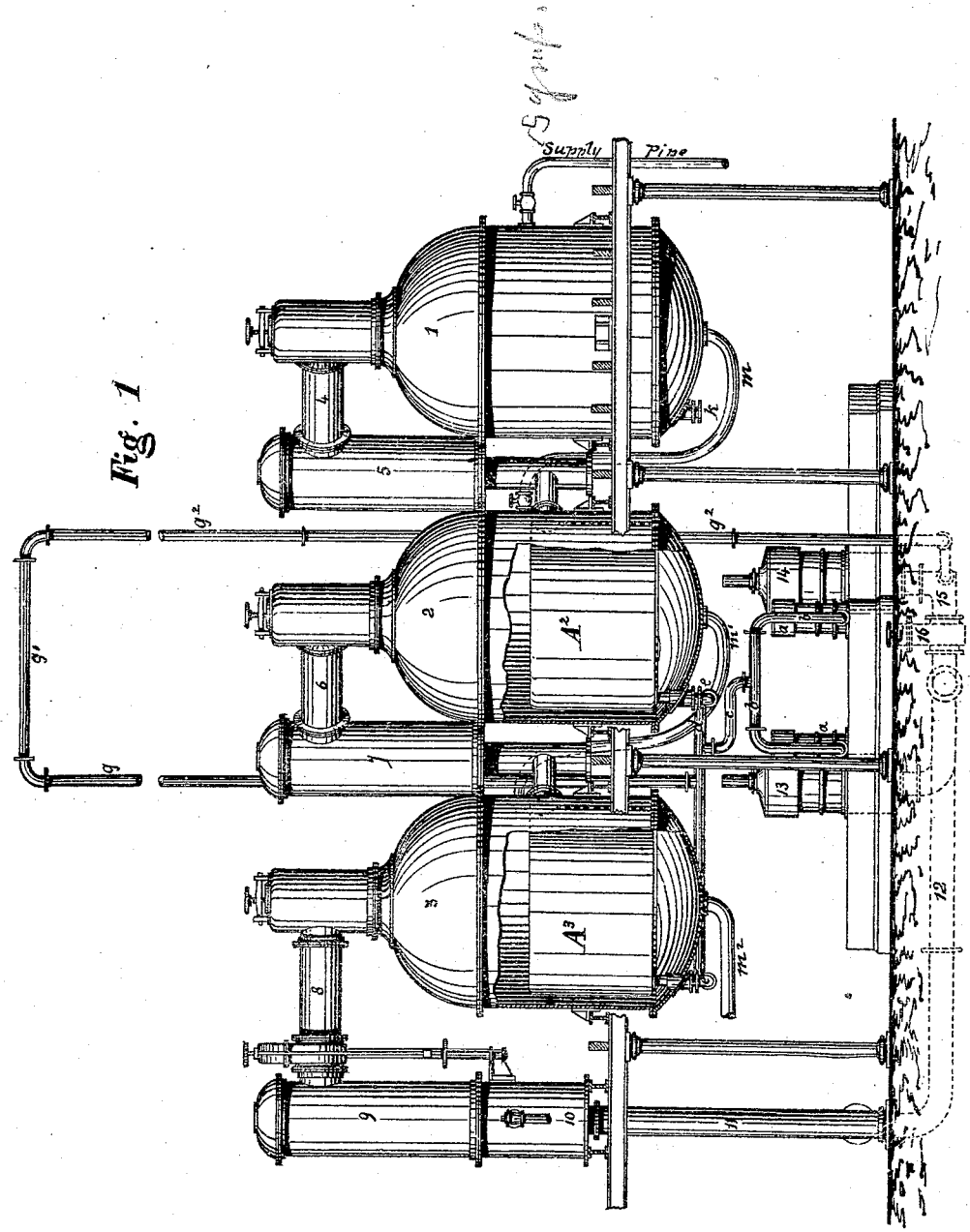

3 Sheets—Sheet 1.

J. P. CAHILL.
DOUBLE AND TREBLE EFFECT SUGAR APPARATUS.

No. 184,032. Patented Nov. 7, 1876.

Witnesses:
W. T. Hutchinson.
Edmund Masson

Inventor:
James P. Cahill.
By Atty A. B. Stoughton.

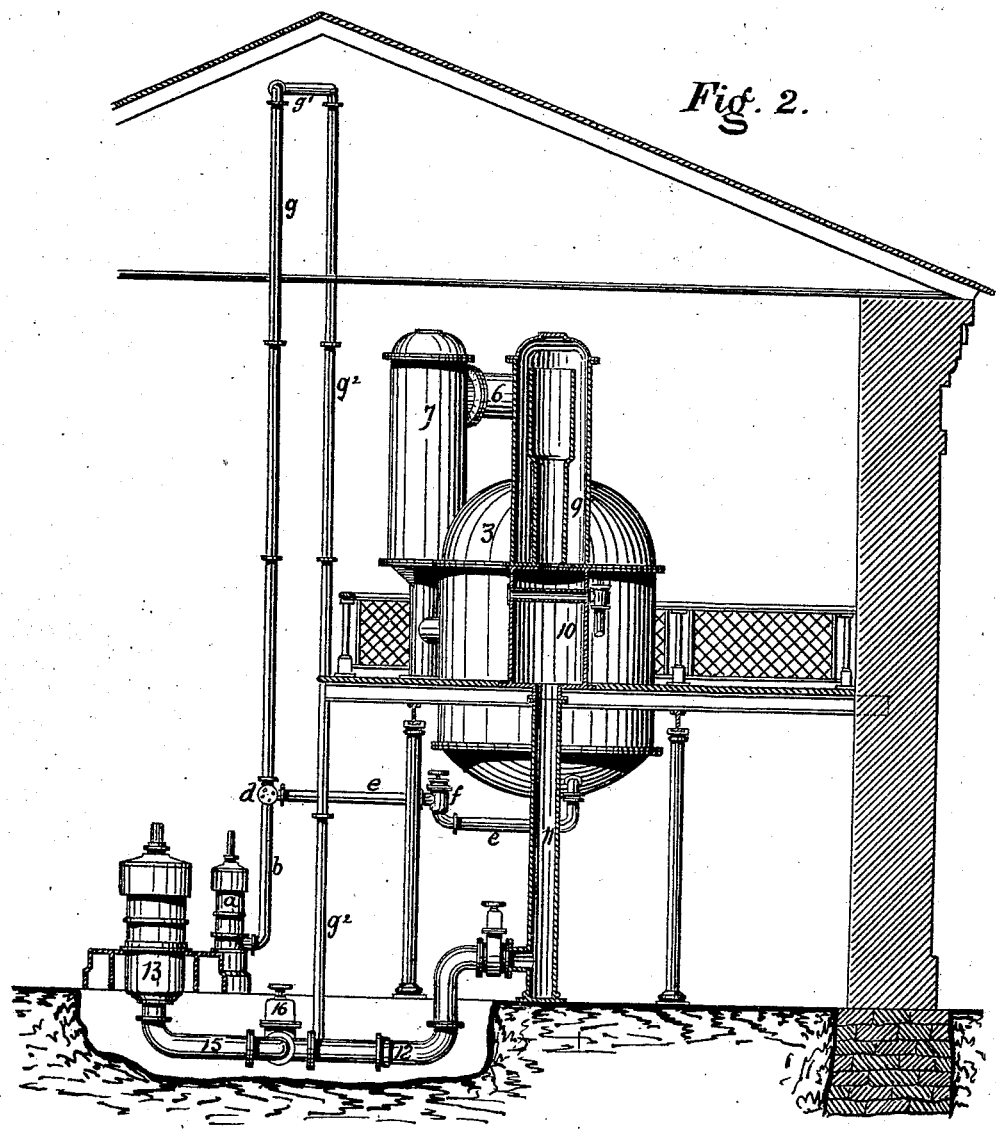

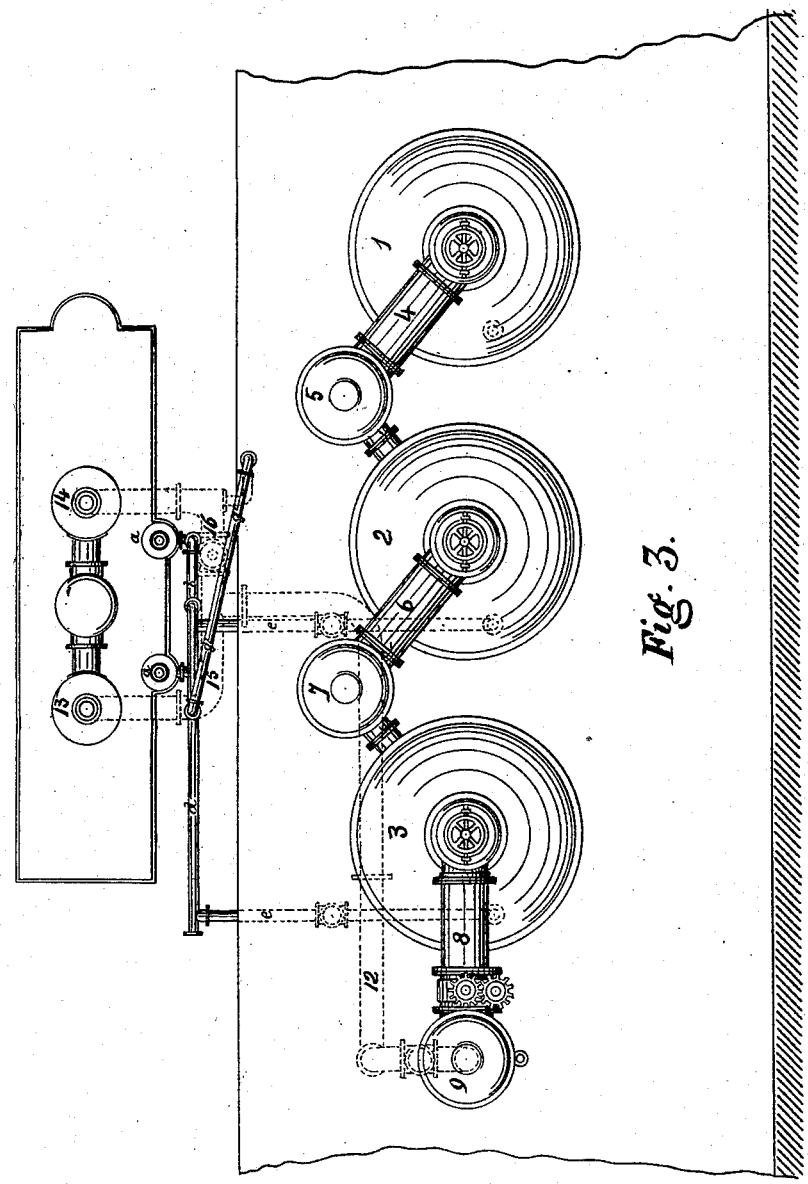

UNITED STATES PATENT OFFICE.

JAMES P. CAHILL, OF LIMA, PERU.

IMPROVEMENT IN DOUBLE AND TREBLE EFFECT SUGAR APPARATUS.

Specification forming part of Letters Patent No. 184,032, dated November 7, 1876; application filed October 13, 1874.

*To all whom it may concern:*

Be it known that I, JAMES P. CAHILL, a subject of Great Britain, now residing at Lima, in Peru, South America, have invented a new and useful Improvement in Double and Treble Effect Sugar Apparatus; and that the following is a full, clear, and exact description of the same, reference being had to the accompanying drawings, making a part of this specification, in which—

Figure 1 represents a front view of my apparatus. Fig. 2 represents an end view of the same, partly in section. Fig. 3 represents a top view of the same.

Similar letters of reference, where they occur in the several figures, denote like parts of the apparatus in all the drawings.

In the operation of manufacturing sugar as heretofore practiced a large quantity of pure water is required for washing the animal bone-black used for filters, tanks, &c., and also for supplying the boilers. The sugar-works being often located near rivers where the water is periodically very muddy, it is consequently unfit for the above purposes.

The object of my invention is to save the "sweet water" of condensation and produce a better vacuum on the first and second pan of the apparatus by means of a pipe extended to a height of about thirty-three feet, having its extreme end connected with the air-pumps, while the sweet water is taken from its lower end by the sweet-water pumps. By this means I can make at least twenty per cent. more sugar with the same number of pans.

To enable others skilled in the art to make and use my invention, I will proceed to describe the same with reference to the drawings.

1 2 3 represent ordinary vacuum-pans used in boiling sugar-cane juice. Each contains a drum having a large number of vertical tubes, through which the cane-juice can circulate. The drum in the first pan receives the exhaust steam from the engine, and, after transmitting its latent heat to the cane-juice which has been pumped into the first pan, condenses, and is conducted through the pipe $k$ to a reservoir to supply the boiler. The cane-juice in pan 1 being boiled by the exhaust steam, the vapor arising from it passes through the pipe 4 to the drum $A^2$ of the pan 2. The cane-juice of the first pan having passed, by vacuum, through the pipe $m$ to the pan 2, it is again boiled by the latent heat communicated by the steam through the drum $A^2$ of the pan 2. The water of condensation inside of the drum $A^2$ is drawn out by the sweet-water pumps $a$ $a$ through the pipes $b$ $c$ $d$ $e$.

The above-mentioned apparatus or operation has been heretofore used; but it does not produce perfect condensation of the vapor from pan 1 in the drum $A^2$, as no injection-water can be used in the sweet-water pumps $a$, in order to save all the sweet water produced. To produce a better vacuum on the first pan, I connect the pipe $d$ (which conducts the water of condensation out of the drum $A^2$) with the elevated pipe $g$, which must stand at least thirty-three feet above the pipe $d$. The upper end of the pipe $g$ is connected, by means of the pipes $g^1$ $g^2$, to the main pipe 15, leading to the air-pumps 13 14, where all the vapor is with certainty condensed.

The above effect is produced in what I call "double-effect sugar apparatus;" and in a "treble-effect sugar apparatus," as shown in the drawings, the operation is continued as follows: The vapor arising from the cane-juice in the pan 2 passes through the pipe 6 to the drum $A^3$ of the pan 3, where, after imparting its heat to the drum $A^3$, it condenses, and is drawn off through the pipes $e$ $d$ $c$ $b$ by the sweet-water pumps $a$, and, as in the case of the drum $A^2$, a very efficient vacuum is produced in the drum $A^3$ by the elevated pipe $g$, which is connected with the drums $A^2$ $A^3$ by means of the pipe $d$, which carries off the water of condensation of these drums. The apparatus is also provided with the receptacles 5 and 7, to receive the sirup if the pans 1 and 2 should happen to boil over. The heat thrown off by the drum $A^3$ boils the sirup introduced by vacuum, through the pipe $m^1$, from the pan 2 to the pan 3, and the vapor arising from it passes through the pipe 8, and through the condenser 9 10, where it meets a current of cold water, and is drawn off by the air-pumps 13 14 through the pipes 11, 12, and 15; and the sirup in the pan 3 is drawn off through the bottom of it through the pipe $m^2$, and pumped into clarifiers, from which it passes to the filters, and from the filters to a tank, from which it is taken to a strike-pan and boiled into sugar to any degree that is necessary for coarse or fine grain. This last portion of the operation is not shown in the drawings, as it is the ordinary method used in practice.

The apparatus is provided with cocks and and openings, closed and opened so as to regulate its operation.

Having thus fully described my invention, what I claim therein as new, and desire to secure by Letters Patent, is—

In combination with a double or treble effect sugar apparatus, as herein described, the elevated pipe $g$ and its connections with the air-pumps of the apparatus, thereby producing a better vacuum in the pans, substantially as and for the purposes set forth.

JAMES P. CAHILL.

Witnesses:
 EDMUND MASSON,
 A. B. STOUGHTON.